(12) United States Patent
Kim (10) Patent No.: US 9,758,191 B2
(45) Date of Patent: Sep. 12, 2017

(54) ZERO POINT CALIBRATION APPARATUS AND METHOD FOR STEERING ANGLE SENSOR USING ROTATIONAL DISPLACEMENT DIFFERENCE

(71) Applicant: HYUNDAI MOBIS CO., LTD., Seoul (KR)

(72) Inventor: Dong Hee Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 15/071,735

(22) Filed: Mar. 16, 2016

(65) Prior Publication Data

US 2016/0272239 A1 Sep. 22, 2016

(30) Foreign Application Priority Data

Mar. 18, 2015 (KR) .......................... 10-2015-0037616

(51) Int. Cl.
*B62D 5/04* (2006.01)
*B62D 15/02* (2006.01)

(52) U.S. Cl.
CPC ................................. *B62D 15/021* (2013.01)

(58) Field of Classification Search
CPC .................................................. B62D 15/021
See application file for complete search history.

(56) References Cited

U.S. PATENT DOCUMENTS

| 5,243,188 A * | 9/1993 | Hattori | .................. B62D 15/02 250/231.16 |
| 7,085,638 B2 * | 8/2006 | Knoll | ................. B62D 15/0215 250/231.15 |

(Continued)

FOREIGN PATENT DOCUMENTS

| JP | 2007-218822 A | 8/2007 |
| JP | 5401875 B * | 11/2013 |

(Continued)

OTHER PUBLICATIONS

Korean Office Action dated Dec. 1, 2015 of corresponding Korean Patent Application No. 10-2015-0037616—4 pages.

(Continued)

*Primary Examiner* — Adam Tissot
*Assistant Examiner* — Michael Berns
(74) *Attorney, Agent, or Firm* — Knobbe Martens Olson & Bear LLP (57) ABSTRACT

A zero point calibration apparatus for a steering angle sensor using a rotational displacement difference includes: a steering angle sensor configured to sense a steering angle of a column in a steering apparatus for a vehicle; a motor angle sensor configured to sense a rotation angle of a motor which supports steering by the column in the steering apparatus; and a control unit configured to calculate a current rotational displacement difference pattern between the steering angle and the motor angle, and derive the middle point of the current rotational displacement difference pattern. When the middle point does not coincide with a zero point set in the steering angle sensor, the control unit determines that the zero point set in the steering angle sensor is abnormal, and calibrate the zero point.

17 Claims, 5 Drawing Sheets

(56) References Cited

U.S. PATENT DOCUMENTS

| | | | | |
|---|---|---|---|---|
| 8,308,174 B2* | 11/2012 | Muth | .................... | B62D 7/1581 |
| | | | | 180/412 |
| 8,494,718 B2* | 7/2013 | Muth | .................... | B62D 7/1581 |
| | | | | 701/42 |
| 9,205,869 B2* | 12/2015 | Turner | ................ | B62D 15/0215 |
| 2010/0241314 A1* | 9/2010 | Bohm | .................. | B62D 7/1581 |
| | | | | 701/41 |
| 2015/0274206 A1* | 10/2015 | Takeda | .................... | B62D 6/008 |
| | | | | 701/41 |
| 2016/0347311 A1* | 12/2016 | Kurata | ................. | B62D 15/025 |
| 2016/0362128 A1* | 12/2016 | Sugawara | ................ | B62D 5/04 |

FOREIGN PATENT DOCUMENTS

| | | |
|---|---|---|
| JP | 2014-133428 A | 7/2014 |
| KR | 10-2007-0072704 A | 7/2007 |
| KR | 10-0767185 B1 | 10/2007 |

OTHER PUBLICATIONS

Notice of Allowance dated May 3, 2016 of corresponding Korean Patent Application No. 10-2015-0037616—2 pages.

* cited by examiner

ZERO POINT CALIBRATION APPARATUS AND METHOD FOR STEERING ANGLE SENSOR USING ROTATIONAL DISPLACEMENT DIFFERENCE

CROSS-REFERENCES TO RELATED APPLICATIONS

The present application claims priority to Korean application number 10-2015-0037616, filed on Mar. 18, 2015, which is incorporated by reference in its entirety.

BACKGROUND

The present disclosure relates to a zero point calibration apparatus and method for a steering angle sensor using a rotational displacement difference.

Recently, more and more vehicles include a motor driven power steering (MDPS) as an auxiliary steering apparatus.

The MDPS is also referred as an electronic power steering (EPS), and provides a driving force of the power steering, which assists a force applied to a steering wheel during a steering operation, through a motor instead of hydraulic pressure.

The related technology is disclosed in Korean Patent Laid-open Publication No. 10-2007-0072704 published on Jul. 5, 2007, and entitled "Zero point calibration method of steering angle sensor"

SUMMARY

Embodiments of the present invention are directed to a zero point calibration apparatus and method for a steering angle sensor using a rotational displacement difference, which determines a zero-point shift of the steering angle sensor by calculating a rotational displacement difference between a steering angle and a motor angle and calibrates the zero point of the steering angle sensor, in a variable gear rack system in which the gear ratio of a rack is varied at each section.

In one embodiment, a zero point calibration apparatus for a steering angle sensor using a rotational displacement difference may include: a steering angle sensor configured to sense a steering angle of a column in a steering apparatus for a vehicle; a motor angle sensor configured to sense a rotation angle of a motor which supports steering by the column in the steering apparatus; and a control unit configured to calculate a current rotational displacement difference pattern between the steering angle and the motor angle, based on the steering angle sensed through the steering angle sensor and the motor angle sensed through the motor angle sensor, and derive the middle point of the current rotational displacement difference pattern. When the middle point does not coincide with a zero point set in the steering angle sensor, the control unit may determine that the zero point set in the steering angle sensor is abnormal, and calibrate the zero point.

The control unit may calculate the current rotational displacement difference pattern between the steering angle and the motor angle by subtracting '(motor angle)*(motor-side rack gear ratio)*(colunnn-factor (C-factor))*(rotation direction)' from the steering angle sensed through the steering angle sensor.

When the zero point set in the steering angle sensor does not coincide with the middle point of the calculated current rotational displacement difference pattern between the steering angle and the motor angle, the control unit may determine that the zero point of the steering angle sensor is abnormally set.

When the zero point set in the steering angle sensor coincides with the middle point of the calculated current rotational displacement difference pattern between the steering angle and the motor angle, the control unit may determine that the zero point of the steering angle sensor is normally set.

When the zero point of the steering angle sensor is abnormally set, the control unit may calculate a difference between the middle point of the calculated current rotational displacement difference pattern and the zero point of the steering angle sensor as a zero-point shift amount of the steering angle sensor, and calibrate the zero point of the steering angle sensor using the calculated shift amount.

The control unit may calibrate the zero point by subtracting the shift amount when the zero point of the steering angle sensor was shifted in the positive (+) direction, and calibrate the zero point by adding the shift amount when the zero point was shifted in the negative (−) direction.

The steering apparatus may include a variable gear double pinion steering apparatus which includes a driving pinion added separately from a steering pinion installed at an end of the column and assists steering by the rotation of the column using a motor connected to the driving pinion.

The variable gear double pinion steering apparatus may engage a steering pinion installed at an end of a steering column with a rack in a gear box so as to convert a rotary motion of the steering column into a linear motion, include the driving pinion for transmitting rotation of the motor to the rack in addition to the steering pinion connected to the steering column, and assist steering by the steering pinion through the driving pinion which is engaged with the rack so as to transmit the rotation of the motor.

The rack at the part engaged with the steering pinion may be formed with a variable gear rack, and the rack at the part engaged with the driving pinion may be formed with a fixed gear rack.

In another embodiment, a zero point calibration method for a steering angle sensor using a rotational displacement difference may include: sensing, by a steering angle sensor, a steering angle of a column in a steering apparatus for a vehicle; sensing, by a motor angle sensor, a rotation angle of a motor which supports steering by the column in the steering apparatus; calculating, by a control unit, a current rotational displacement difference pattern between the steering angle and the motor angle, based on the steering angle sensed through the steering angle sensor and the motor angle sensed through the motor angle sensor, and deriving the middle point of the current rotational displacement difference pattern; determining, by the control unit, whether the middle point coincides with a zero point set in the steering angle sensor; and determining that the zero point set in the steering angle sensor is abnormal, when the middle point does not coincide with the zero point set in the steering angle sensor, and calibrating the zero point of the steering angle sensor.

In the calculating of the current rotational displacement difference pattern, the control unit may calculate the current rotational displacement difference pattern between the steering angle and the motor angle by subtracting '(motor angle)*(motor-side rack gear ratio)*(colunnn-factor (C-factor))*(rotation direction)' from the steering angle sensed through the steering angle sensor.

In the determining of whether the middle point coincides with the zero point set in the steering angle sensor, when the zero point set in the steering angle sensor does not coincide with the middle point of the calculated current rotational displacement difference pattern between the steering angle and the motor angle, the control unit may determine that the zero point of the steering angle sensor is abnormally set.

In the determining of whether the middle point coincides with the zero point set in the steering angle sensor, when the zero point set in the steering angle sensor coincides with the middle point of the calculated current rotational displacement difference pattern between the steering angle and the motor angle, the control unit may determine that the zero point of the steering angle sensor is normally set.

In the calibrating of the zero point of the steering angle sensor, the control unit may calculate a difference between the middle point of the calculated current rotational displacement difference pattern and the zero point of the steering angle sensor as a zero-point shift amount of the steering angle sensor, and calibrate the zero point of the steering angle sensor using the calculated shift amount.

The control unit may calibrate the zero point by subtracting the shift amount when the zero point of the steering angle sensor was shifted in the positive (+) direction, and calibrate the zero point by adding the shift amount when the zero point was shifted in the negative (−) direction.

The steering apparatus may include a variable gear double pinion steering apparatus which includes a driving pinion added separately from a steering pinion installed at an end of the column and assists steering by the rotation of the column using a motor connected to the driving pinion.

A rack at a part engaged with the steering pinion may be formed with a variable gear rack, and a rack at a part engaged with the driving pinion may be formed with a fixed gear rack.

DESCRIPTION OF EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

An MDPS controls the entire steering system through an electronic control unit (ECU). The MDPS detects direction, angle, angular speed, and torque information through sensors and sends the detected information to the ECU. The ECU systematizes the received information into an equation and drives the motor based on the optimized tuning logic according to a driver's intention.

For example, a steering angle applied to a rack system having a constant gear ratio is linked to a motor angle of the MDPS through a rack. Thus, when a column factor (C-factor) is applied to compensate for a gear ratio difference of the link part at a normal condition in which the gear ratio is fixed, the same displacement can be acquired within an error range. The C-factor indicates a lateral displacement of a rack bar in the side-to-side direction per rotation of a pinion.

On the other hand, in a variable gear rack system, the gear ratios around the center and both ends of a rack are variable.

The variable gear ratios are aimed at improving the steering stability when the vehicle is driven straight. Around the center of the rack, the gear ratio is set to a relatively small ratio (for example, 16:1). Thus, as the gear ratio around both ends of the rack is set to a relatively large ratio (for example, 19:1), the variable gear rack system can reduce the steering force. That is, the shape of the rack included in the variable gear rack system is changed in such a manner that the distance between screw threads formed on the rack gradually increases from the center of the rack toward both ends of the rack. Therefore, as the steering angle of a steering wheel is increased, the moving distance of the rack is also increased to reduce torque applied to the pinion.

However, a determination logic for determining the zero point state of a steering angle sensor determines that the zero point state is abnormal when the zero point exceeds the right and left range of 700 degrees in the steering wheel. However, actual vehicles have a permissible value as high as about 160 degrees. Thus, when the zero point is incorrectly set within 160 degrees, the determination logic cannot diagnose a failure and cannot find the accurate position of the zero point. Thus, the zero point of the steering angle sensor cannot be automatically calibrated. In this case, the zero point of the steering angle can be set only by a mechanic in a motor serve center.

Figure 1:
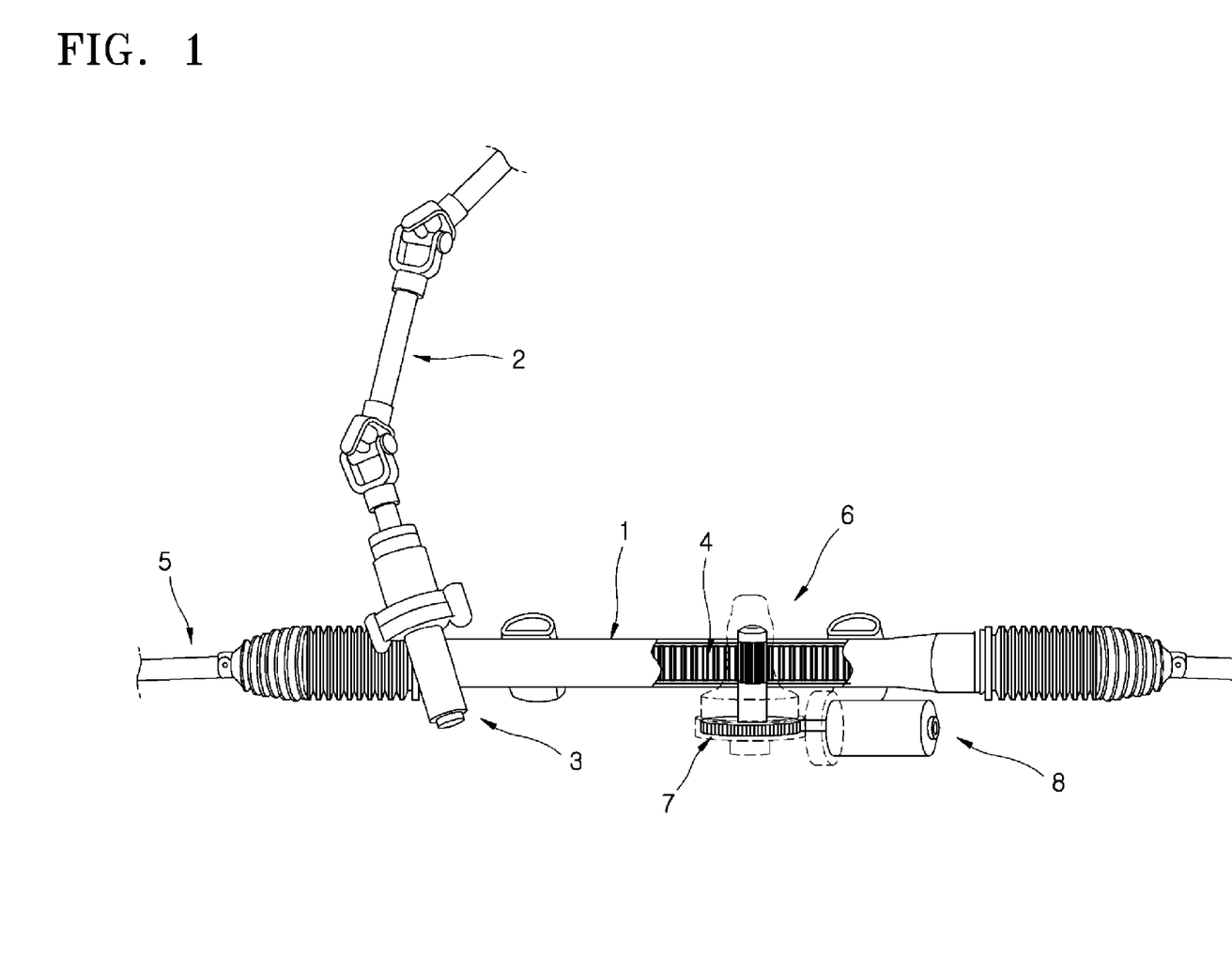
FIG. 1 illustrates a variable gear double pinion steering apparatus to which a zero point calibration method for a steering angle sensor using a rotational displacement difference in accordance with an embodiment of the present invention can be applied.

FIG. 1 illustrates a variable gear double pinion steering apparatus to which a zero point calibration method for a steering angle sensor using a rotational displacement difference in accordance with an embodiment of the present invention can be applied. The variable gear double pinion steering apparatus of FIG. 1 can assist a steering driving operation by a motor through a pinion which is added separately from a pinion of a steering system.

Referring to FIG. 1, the double pinion steering apparatus to which the zero point calibration method for a steering angle sensor using a rotational displacement difference in accordance with the embodiment of the present invention can be applied may engage a steering pinion (first pinion) 3 installed at an end of a steering column 2 with a rack 4 in a gear box 1 so as to convert a rotary motion of the steering column 2 into a linear motion. In addition to the steering pinion (first pinion) 3 connected to the steering column 2, a driving pinion (second pinion) 6 for transmitting the rotation of a motor 8 to the rack 4 may be engaged with the rack 4. Thus, the driving pinion 6 for transmitting the rotation of the motor 8 may assist a steering operation by the steering pinion 3.

The double pinion steering apparatus may transmit a steering force to a wheel through a tie rod 5 connected to the rack 4 through a ball joint.

At this time, the rack 4 at the part engaged with the steering pinion (first pinion) 3 may be formed with a variable gear rack, and the rack 4 at the part engaged with the driving pinion (second pinion) 6 may be formed with a fixed gear rack. Hereafter, the rack 4 at the part engaged with the steering pinion 3 will be referred to as a column-side rack, and the rack 4 at the part engaged with the driving pinion 6 will be referred to as a motor-side rack.

Figure 2:
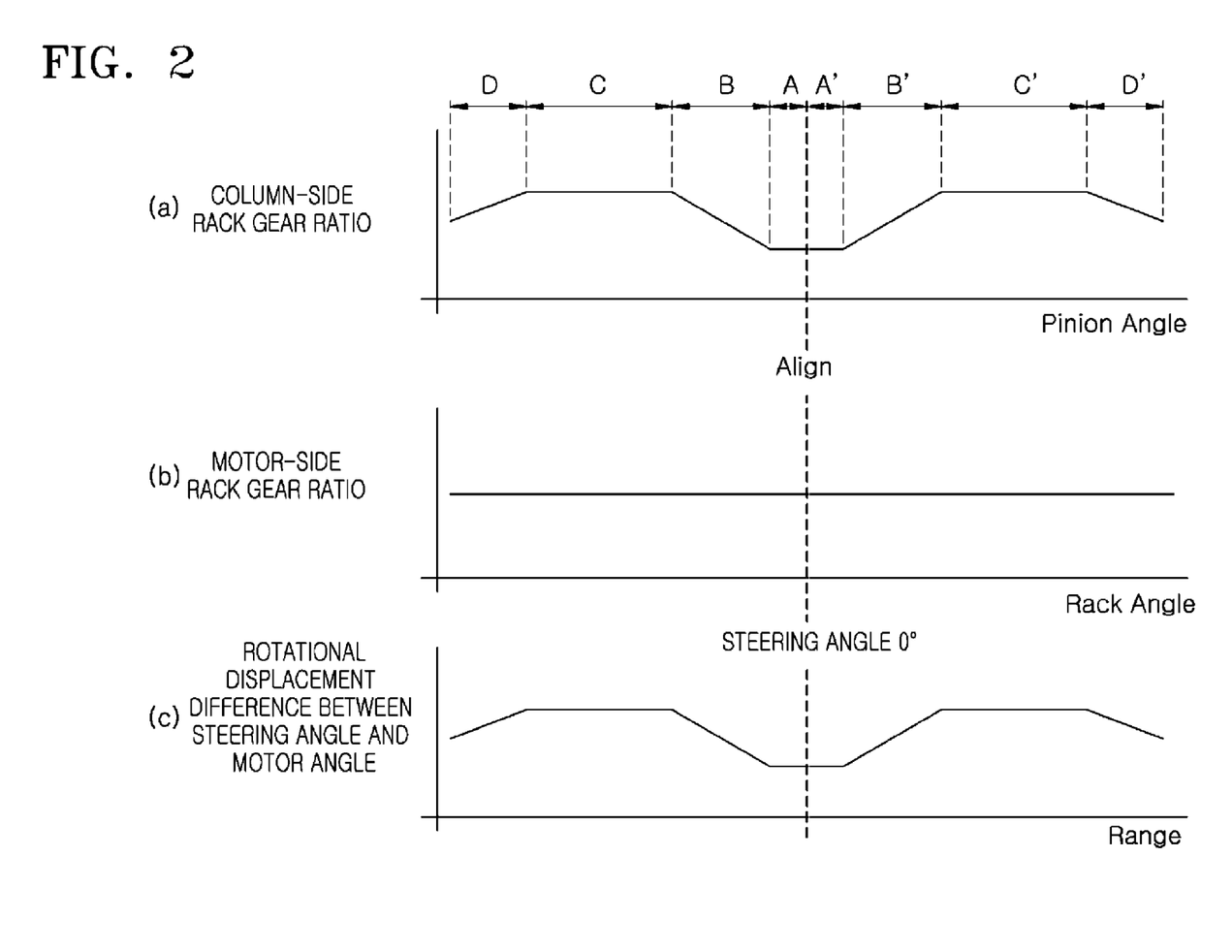
FIG. 2 is a graph for describing a rotational displacement difference between a steering angle and a motor angle based on a difference between a column-side rack gear ratio and a motor-side rack gear ratio in FIG. 1.

At this time, the gear ratio of the column-side rack (refer to (a) of FIG. 2) may be constantly maintained at a section A or A' around the center, gradually increased at a section B or B' after the section A or A', constantly maintained at a section C or C' after the section B or B', and gradually decreased at a section D or D' after the section C or C'.

However, the gear ratio increase/decrease pattern may be changed according to a steering apparatus.

On the other hand, the motor-side rack gear ratio (refer to (b) of FIG. 2) may be constantly maintained at both sides of the center.

Thus, due to the structural characteristic of the motor 8 which is rotated according to the rotation of the steering column 2 connected to the steering pinion (first pinion) 3, in embodiments, the motor 8 which is connected to the driving pinion (second pinion) 6, a rotational displacement difference may occur between the steering angle (column rotation angle sensed by the steering angle sensor) and the motor angle (motor rotation angle sensed by a motor angle sensor).

In embodiments, referring to FIG. 2, the column-side rack gear ratio and the motor-side rack gear ratio may be constant at the section A or A'. Thus, when the column 2 is rotated at a constant angle, the motor 8 may also be rotated at the constant angle. At the section B or B', however, the column-side rack gear ratio may be gradually increased (relatively increased from the previous section). Thus, although the column 2 is rotated at the constant angle, the moving distance of the rack 4 may be increased. Then, the rotation angle of the motor 8 connected to the rack 4 may also be increased.

At the section C or C', the column-side rack gear ratio and the motor-side rack gear ratio may be constant. Thus, when the column 2 is rotated at a constant angle, the motor 8 may also be rotated at the constant angle. At the section D or D', however, the column-side rack gear ratio may be gradually decreased (relatively decreased from the previous section). Thus, although the column 2 is rotated at the constant angle, the moving distance of the rack 4 may be decreased. Then, the rotation angle of the motor 8 connected to the rack 4 may also be decreased.

As a result, a rotational displacement difference between the steering angle (the column rotation angle sensed through the steering angle sensor) and the motor angle (the motor rotation angle sensed through the motor angular sensor) may occur as illustrated in (c) of FIG. 2. The rotational displacement difference ((c) of FIG. 2) may follow the column-side rack gear ratio ((a) of FIG. 2).

The initial value of the steering angle sensor 110 for sensing the rotation angle (or steering angle) of the column 2 needs to be set to an accurate value. The initial value may indicate zero degrees as a steering angle outputted from the steering angle sensor, when the wheels are correctly aligned. In this case, the steering angle sensor 110 can output the steering angle information (or sensing value) corresponding to the actual steering angle of the steering wheel (or the actual steering angle of the column).

Figure 3:
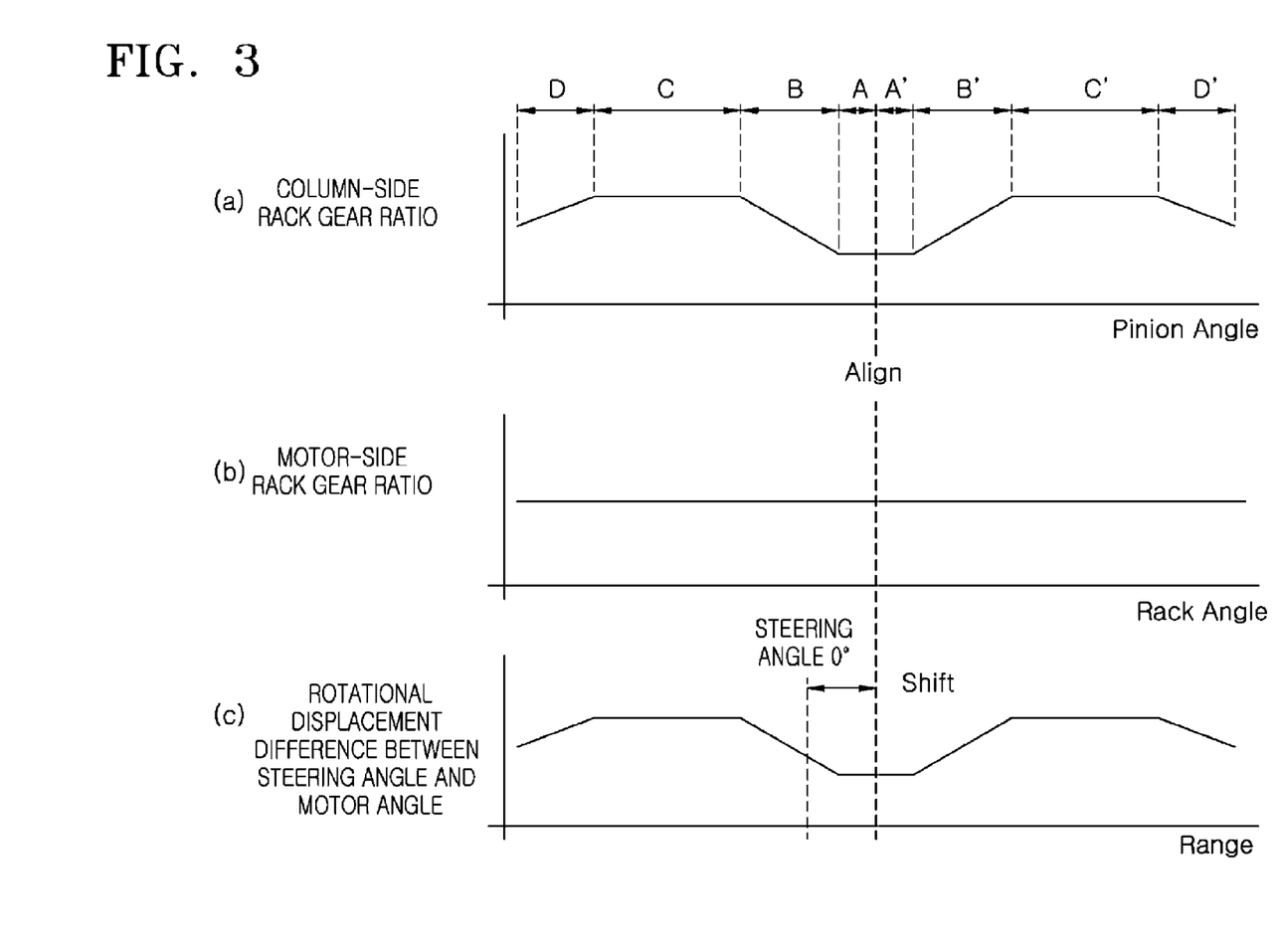
FIG. 3 is a graph for describing a state in which the zero point of the steering angle sensor is shifted, in FIG. 2.

However, when the initial value (or zero point) of the steering angle outputted from the steering angle sensor 110 is incorrectly set, the steering angle sensor 110 may output a value obtained by adding or subtracting a constant value to or from the actual steering angle of the steering wheel (or column) as the sensing value (refer to FIG. 3). The constant value may indicate a value corresponding to an incorrectly set zero point or a value shifted from the zero point, and the value obtained by adding or subtracting the constant value may indicate the steering angle to or from which the value corresponding to the shifted zero point is added or subtracted.

Such a steering angle sensing error of the steering angle sensor 110 may not occur due to a failure of the sensor (in embodiments, when a sensor failure occurs, a wrong value is outputted regardless of rotation), but occur when the initial value is incorrectly set due to a physical (or electrical) impact while the vehicle is released or operated. The initial value may indicate the zero point of the steering sensor, corresponding to the actual steering angle of the steering wheel or column. In a typical system, the initial steering angle (zero point) of the steering angle sensor can be set only in a motor service center.

However, the apparatus and method in accordance with the embodiment of the present invention can automatically calibrate the zero point of the steering angle sensor 110 when the initial value (or zero point) of the steering angle outputted from the steering angle sensor 110 is incorrectly set in the variable gear double pinion steering apparatus.

Figure 4:
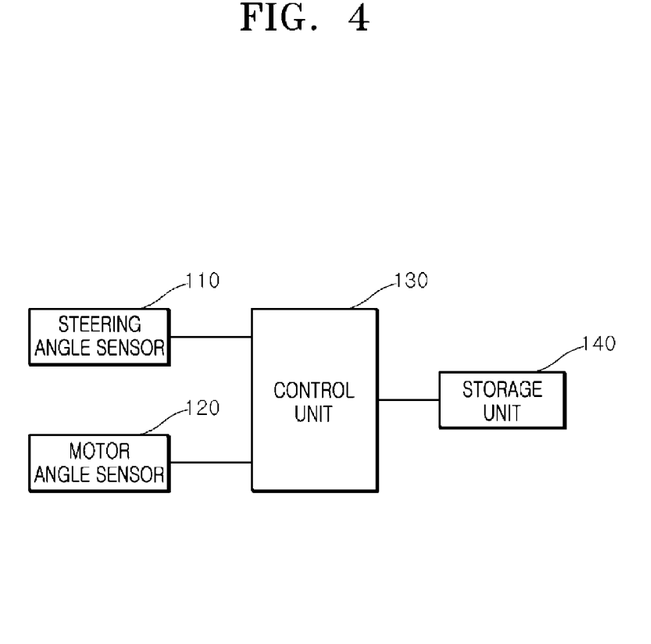
FIG. 4 is a diagram illustrating the schematic configuration of a zero point calibration apparatus for a steering angle sensor using a rotational displacement difference in accordance with an embodiment of the present invention.

FIG. 4 is a diagram illustrating the schematic configuration of a zero point calibration apparatus for a steering angle sensor using a rotational displacement difference in accordance with an embodiment of the present invention.

As illustrated in FIG. 4, the zero point calibration apparatus for a steering angle sensor using a rotational displacement difference in accordance with the embodiment of the present invention may include a steering angle sensor 110, a motor angle sensor 120, a control unit 130, and a storage unit 140.

The steering angle sensor 110 may sense the rotation angle (or steering angle) of the steering column 2. When the zero point of the steering angle sensor 110 is correctly set to coincide with the actual zero point (or end point) of the steering wheel (or column), the steering angle sensor 110 may output an accurate value corresponding to the actual steering angle of the steering wheel (or column).

However, when the zero point of the steering angle sensor 110 is incorrectly set to be shifted (for example, −10 degrees), the steering angle sensor 110 may output a sensing steering angle obtained by reflecting the incorrectly-set zero point into the actual steering angle of the steering wheel (or column). For example, when it is assumed that the actual steering angle is 30 degrees, the steering angle sensed and outputted by the steering angle sensor 110 may correspond to 20 degrees. Such a steering angle sensor may not occur due to a sensor failure, but occur when the zero point is incorrectly set.

The motor angle sensor 120 may sense the rotation angle of the motor 8.

The storage unit 140 may previously store one or more of a column-side rack gear ratio, a motor-side rack gear ratio, a C-factor between the first point (steering pinion) 3 and the second pinion (driving pinion) 6, and a rotational displacement difference (in embodiments, rotational displacement difference pattern) between the steering angle and the motor angle which are calculated in a normal state.

The control unit 130 may calculate a rotational displacement difference between the steering angle and the motor angle, based on the steering angle information sensed through the steering angle sensor 110, the motor angle information sensed through the motor angle sensor 120, the rack gear ratio, the C-factor, and rotation direction information. The C-factor may indicate a lateral displacement of a rack bar in the side-to-side direction per rotation of a pinion.

At this time, the rotational displacement difference may be calculated by subtracting (motor angle*motor-side rack gear ratio*C-factor*rotation direction) from the steering angle sensed through the steering angle sensor 110.

The rotation direction may be set to 1 to −1.

For example, while the steering wheel is rotated in all directions (for example, from −540 degrees to +540 degrees), the rotational displacement difference calculation method may be applied to calculate a current rotational displacement difference pattern for the steering apparatus. However, when an error exists in the zero point of the steering angle sensor 110, the middle point of the current rotational displacement difference pattern may not coincide with the sensing zero point outputted through the steering angle sensor 110 (refer to (c) of FIG. 3).

When the middle point of the current rotational displacement difference pattern does not coincide with the sensing zero point outputted through the steering angle sensor 110, it may indicate that the zero point of the steering angle sensor 110 is shifted by a difference therebetween.

Furthermore, when the middle point of the current rotational displacement difference pattern does not coincide with the zero point set in the steering angle sensor 110, a difference may occur between the current rotational displacement difference pattern and the rotational displacement difference pattern between the steering angle and the motor angle, which has been previously stored in the storage unit 140 and calculated in a normal state. In embodiments, a pattern in any one direction may be enlarged, and the pattern in the opposite direction may be shortened. Thus, the control unit 130 may compare the shapes of the two rotational displacement difference patterns, and determine that the zero point set in the steering angle sensor 110 is shifted by the difference between the middle points thereof.

When it is determined that the zero point outputted through the steering angle sensor 110 is shifted, the control unit 130 may calculate a shift amount of the zero point.

Then, the control unit 130 may calibrate the zero point set in the steering angle sensor 110 by the calculated shift amount. In embodiments, when the zero point is shifted in the positive (+) direction, the control unit 130 may reset the zero point of the steering angle sensor 110 by subtracting the shift amount, and when the zero point is shifted in the negative (−) direction, the control unit 130 may reset the zero point of the steering angle sensor 110 by adding the shift amount.

As described above, the control unit 130 may automatically calibrate the zero point set by the steering angle sensor 110.

Figure 5:
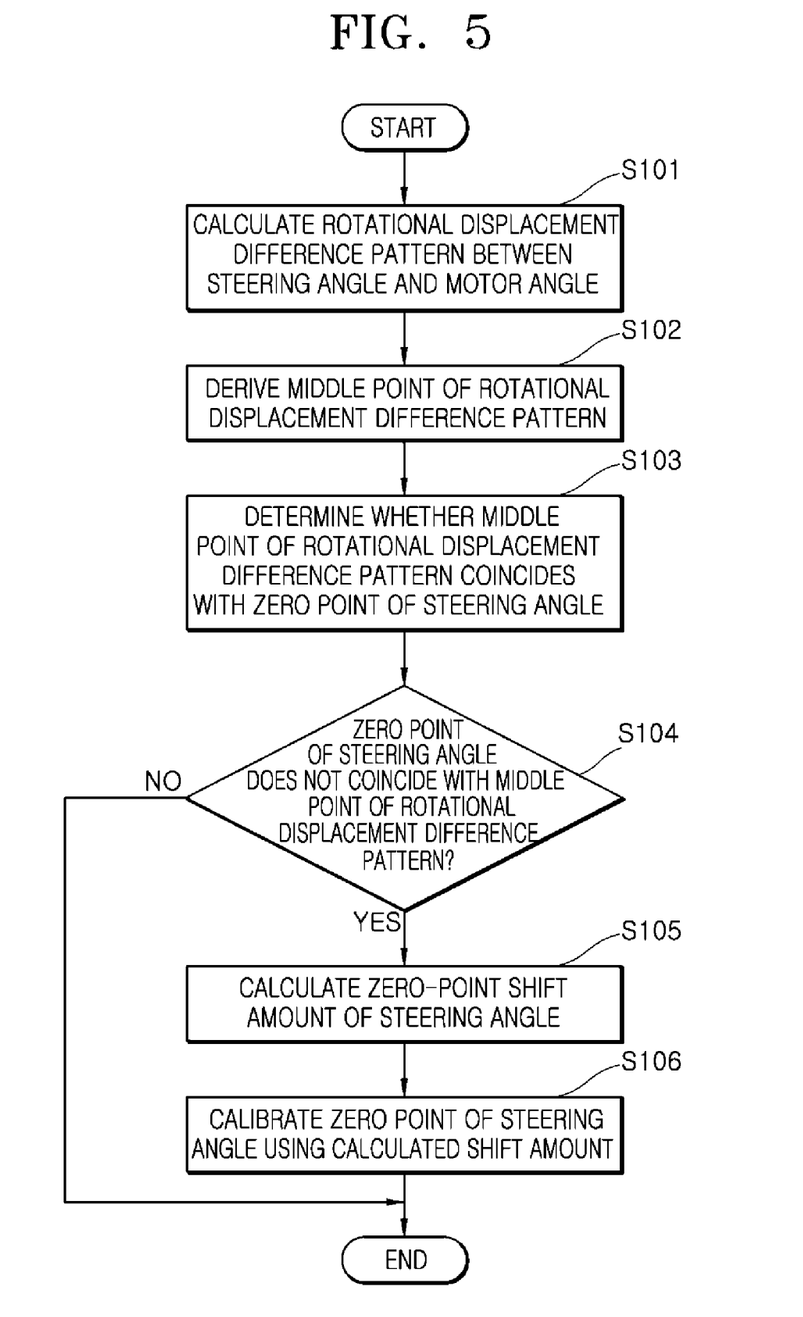
FIG. 5 is a flowchart illustrating a zero point calibration method for a steering angle sensor using a rotational displacement difference in accordance with an embodiment of the present invention.

FIG. 5 is a flowchart illustrating a zero point calibration method for a steering angle sensor using a rotational displacement difference in accordance with an embodiment of the present invention.

As illustrated in FIG. 5, the control unit 130 may subtract (motor angle*motor*-size rack gear ratio*C-factor*rotation angle) from a steering angle sensed through the steering angle sensor 110 while the steering wheel is rotated in all directions (for example, from −540 degrees to +540 degrees), and calculate a current rotational displacement difference pattern between a steering angle and a motor angle for the steering apparatus, at step S101.

The control unit 130 may derive the middle point of the calculated current rotational displacement pattern between the steering angle and the motor angle of the steering apparatus, at step S102.

Then, the control unit 130 may determine whether the middle point of the calculated current rotational displacement difference pattern between the steering angle and the motor angle of the steering apparatus coincides with the zero point set tin the steering angle sensor 110, at step S103.

When the zero point set in the steering angle sensor 110 coincides with the middle point of the calculated current rotational displacement difference pattern between the steering angle and the motor angle of the steering apparatus (No at step S104), it may indicate that the sensing zero point outputted through the steering angle sensor 110 is normally set.

However, when the zero point set in the steering angle sensor 110 does not coincide with the middle point of the calculated current rotational displacement difference pattern between the steering angle and the motor angle of the steering apparatus (Yes at step S104), it may indicate that the zero point set in the steering angle sensor 110 is abnormal.

Thus, when the zero point set in the steering angle sensor 110 is abnormal, the control unit 130 may calculate a difference between the middle point of the calculated current rotational displacement difference pattern and the sensing zero point outputted through the steering angle sensor 110 as a zero-point shift amount set in the steering angle sensor 110, at step S105.

Then, the control unit 130 may calibrate the zero point set in the steering angle sensor 110 using the calculated shift amount, at step S106.

For example, when the zero point is shifted in the positive (+) direction, the control unit 130 may calibrate the zero point by subtracting the shift amount, and when the zero point is shifted in the negative (−) direction, the control unit 130 may calibrate the zero point by adding the shift amount.

In accordance with the embodiments of the present invention, the zero point calibration apparatus and method may determine a zero-point shift of the steering angle sensor by calculating a rotational displacement difference between a steering angle and a motor angle, and calibrate the zero point of the steering angle sensor, in the variable gear rack system in which the gear ratio of the rack is varied. Furthermore, the zero point calibration apparatus and method may compensate for a steering abnormality caused by incorrect setting of the zero point of the steering angle sensor in real time, thereby satisfying the vehicle operation stability and the steering feel. Furthermore, since the zero point of the steering angle does not need to be set in an in-line for vehicles, the process can be simplified.

Although embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. An apparatus for calibrating a steering angle sensor of a vehicle, the apparatus comprising:
    a steering angle sensor configured to sense a steering angle of a column in a steering apparatus for a vehicle;
    a motor angle sensor configured to sense a motor angle representing rotation of a motor configured to drive a rack of the steering apparatus; and a control unit configured to calculate a profile of rotational displacement difference between the steering angle and the motor angle, wherein the profile is calculated by subtracting '(motor angle)*(motor-side rack gear ratio) *(column-factor (C-factor))*rotation direction)' from the steering angle, and wherein the control unit is further configured to derive the middle point of the calculated profile, wherein when the middle point does not coincide with a zero point setting in the steering angle sensor, the control unit is further configured to calibrate a zero point of the steering angle sensor.

2. The apparatus of claim 1, wherein when the zero point in the steering angle sensor does not coincide with the middle point of the calculated current rotational displacement difference profile, the control unit is configured to determine that the zero point of the steering angle sensor is abnormally set.

3. The apparatus of claim 2, wherein when it is determined that the zero point of the steering angle sensor is abnormally set, the control unit is further configured to calculate a difference between the middle point of the rotational displacement difference profile and the zero point of the steering angle sensor as a zero-point shift amount of the steering angle sensor, and to calibrate the zero point of the steering angle sensor using the zero-point shift amount.

4. The apparatus of claim 3, wherein the control unit is configured to calibrate the zero point by subtracting the zero-point shift amount when the zero point of the steering angle sensor was shifted in the positive (+) direction, wherein the control unit is configured to calibrate the zero point by adding the zero-point shift amount when the zero point was shifted in the negative (−) direction.

5. The apparatus of claim 1, wherein when the zero point in the steering angle sensor coincides with the middle point of the calculated current rotational displacement difference profile, the control unit is configured to determine that the zero point of the steering angle sensor is normally set.

6. The apparatus of claim 1, wherein the steering apparatus comprises a variable gear double pinion steering apparatus which includes a driving pinion added separately from a steering pinion installed at an end of the column and configured to assist steering by the rotation of the column using the motor connected to the driving pinion.

7. The point calibration apparatus of claim 6,
wherein the steering pinion is engaged with a rack in a gear box so as to convert a rotary motion of the steering column into a linear motion,
wherein the driving pinion for transmitting rotation of the motor to the rack is connected to the steering column, the driving pinion configured to assist steering by the steering pinion through the driving pinion which is engaged with the rack.

8. The apparatus of claim 6, wherein a portion of the rack engaged with the steering pinion is formed with a variable gear rack, and a portion of the rack engaged with the driving pinion is formed with a fixed gear rack.

9. The apparatus of claim 1, wherein the column-factor represents a lateral displacement of the rack per rotation of a pinion of the steering apparatus.

10. A zero point calibration apparatus for a steering angle sensor using a rotational displacement difference, the apparatus comprising
a steering angle sensor configured to sense a steering angle of a column in a steering apparatus for a vehicle;
a motor angle sensor configured to sense a motor angle of a motor which supports steering by the column in the steering apparatus; and
a control unit configured to calculate a current rotational displacement difference pattern between the steering angle and the motor angle, based on the steering angle sensed through the steering angle sensor and the motor angle sensed through the motor angle sensor, and further configured to derive the middle point of the current rotational displacement difference pattern,
wherein when the middle point does not coincide with a zero point set in the steering angle sensor, the control unit is configured to determine that the zero point set in the steering angle sensor is abnormal, and to calibrate a zero point of the steering angle sensor,
wherein the control unit is configured to calculate the current rotational displacement difference pattern between the steering angle and the motor angle by subtracting '(motor angle)*(motor-side rack gear ratio) *(column-factor (C-factor))*(rotation direction)' from the steering angle sensed through the steering angle sensor.

11. A zero point calibration method for a steering angle sensor using a rotational displacement difference, the method comprising:
sensing, by a steering angle sensor, a steering angle of a column in a steering apparatus for a vehicle;
sensing, by a motor angle sensor, a motor angle of a motor which supports steering by the column in the steering apparatus;
calculating, by a control unit, a current rotational displacement difference pattern between the steering angle and the motor angle, based on the steering angle sensed through the steering angle sensor and the motor angle sensed through the motor angle sensor, and deriving the middle pint of the current rotational displacement difference pattern;
determining, by the control unit, whether the middle point coincides with a zero point set in the steering angle sensor; and
determining that the zero point set in the steering angle sensor is abnormal, when the middle point does not coincide with the zero point set in the steering angle sensor, and calibrating a zero point of the steering angle sensor,
wherein in the calculating of the current rotational displacement difference pattern, the control unit calculates the current rotational displacement difference pattern between the steering angle and the motor angle by subtracting '(motor angle)*(motor-side rack gear ratio) *(column-factor (C-factor))*(rotation direction)' from the steering angle sensed through the steering angle sensor.

12. The method of claim 11, wherein in the determining of whether the middle point coincides with the zero point set in the steering angle sensor,
when the zero point set in the steering angle sensor does not coincide with the middle point of the calculated current rotational displacement difference pattern between the steering angle and the motor angle, the control unit determines that the zero point of the steering angle sensor is abnormally set.

13. The method of claim 11, wherein in the determining of whether the middle point coincides with the zero point set in the steering angle sensor, when the zero point set in the steering angle sensor coincides with the middle point of the calculated current rotational displacement difference pattern between the steering angle and the motor angle, the control unit determines that the zero point of the steering angle sensor is normally set.

14. The method of claim 11, wherein in the calibrating of the zero point of the steering angle sensor, the control unit calculates a difference between the middle point of the calculated current rotational displacement difference pattern and the zero point of the steering angle sensor as a zero-point shift amount of the steering angle sensor, and calibrates the zero point of the steering angle sensor using the calculated shift amount.

15. The method of claim 14, wherein the control unit calibrates the zero point by subtracting the zero-point shift amount when the zero point of the steering angle sensor was shifted in the positive (+) direction, and calibrates the zero point by adding the zero-point shift amount when the zero point was shifted in the negative (−) direction.

16. The method of claim 11, wherein the steering apparatus comprises a variable gear double pinion steering apparatus which includes a driving pinion added separately from a steering pinion installed at an end of the column and assists steering by the rotation of the column using a motor connected to the driving pinion.

17. The method of claim 16, wherein a rack at a part engaged with the steering pinion is formed with a variable gear rack, and a rack at a part engaged with the driving pinion is formed with a fixed gear rack.

* * * * *